United States Patent
Tahara et al.

(10) Patent No.: US 9,897,192 B2
(45) Date of Patent: Feb. 20, 2018

(54) LUBRICATING STRUCTURE FOR SPEED REDUCER

(71) Applicants: AISIN SEIKI KABUSHIKI KAISHA, Kariya (JP); TOYOTA JIDOSHA KABUSHIKI KAISHA, Toyota (JP)

(72) Inventors: Yasuaki Tahara, Nagoya (JP); Noriaki Nonaka, Chiryu (JP); Yoshifumi Ashihara, Anjo (JP); Jun Mikami, Toyota (JP); Satori Ito, Takahama (JP); Daichi Kosaka, Nagoya (JP); Yoshihiro Ikushima, Okazaki (JP); Masaya Michishita, Okazaki (JP); Atsushi Kajikawa, Hekinan (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 131 days.

(21) Appl. No.: 14/926,353

(22) Filed: Oct. 29, 2015

(65) Prior Publication Data
US 2016/0123454 A1 May 5, 2016

(30) Foreign Application Priority Data
Oct. 30, 2014 (JP) .................................. 2014-221107

(51) Int. Cl.
F16H 57/04 (2010.01)

(52) U.S. Cl.
CPC ....... *F16H 57/0409* (2013.01); *F16H 57/045* (2013.01); *F16H 57/048* (2013.01); *F16H 57/0421* (2013.01); *F16H 57/0457* (2013.01)

(58) Field of Classification Search
CPC ............. F16H 57/0409; F16H 57/0421; F16H 57/045; F16H 57/0457; F16H 57/048
See application file for complete search history.

(56) References Cited

U.S. PATENT DOCUMENTS

| 2,049,234 | A | * | 7/1936 | Thomas | ............... F16H 57/0421 184/11.1 |
| 3,529,698 | A | * | 9/1970 | Nelson | ..................... B61C 17/08 184/11.2 |
| 4,470,324 | A | * | 9/1984 | Renk | ................... F16H 57/0423 277/409 |

(Continued)

FOREIGN PATENT DOCUMENTS

| JP | 2006-307908 | A | | 11/2006 |
| JP | 2006307908 | | * | 11/2006 |

(Continued)

OTHER PUBLICATIONS

Office Action dated Aug. 23, 2016 in Japanese Patent Application No. 2014-221107 (with Partial English translation of Office Action).

*Primary Examiner* — Michael A Riegelman
(74) *Attorney, Agent, or Firm* — Oblon, McClelland, Maier & Neustadt, L.L.P.

(57) ABSTRACT

A lubricating structure for a speed reducer includes: a case; a first reduction gear pair provided inside the case; a second reduction gear pair provided inside the case; a first catch tank arranged inside the case; a second catch tank arranged inside the case; a partition member that includes a partition wall that partitions an inside of the case into a first accommodation space in which the first reduction gear pair is accommodated and a second accommodation space in which the second reduction gear pair is accommodated; a first oil passage communicating with the first accommodation space and configured to guide lubricating oil to the first catch tank; a second oil passage communicating with the second accommodation space and configured to guide lubricating oil to the second catch tank; and a communication port provided in the partition member and communicating the first oil passage with the second oil passage.

9 Claims, 6 Drawing Sheets (56) References Cited

U.S. PATENT DOCUMENTS

| | | | | |
|---|---|---|---|---|
| 5,768,954 | A * | 6/1998 | Grabherr | F16H 57/0447 184/11.1 |
| 5,821,653 | A * | 10/1998 | Kinto | B60K 1/00 310/58 |
| 6,864,607 | B2 * | 3/2005 | Hashimoto | B60K 1/00 180/65.1 |
| 7,421,921 | B2 * | 9/2008 | Kimura | F16H 57/043 184/1.5 |
| 8,746,405 | B2 * | 6/2014 | Perakes | F16H 57/0409 184/6.12 |
| 8,899,381 | B2 * | 12/2014 | Ebihara | B60K 7/0007 184/6.12 |
| 9,103,432 | B2 * | 8/2015 | Isomura | F16H 57/0423 |
| 2004/0154846 | A1 * | 8/2004 | Kira | B60K 6/405 180/65.6 |
| 2008/0041179 | A1 * | 2/2008 | Yasui | F16H 57/027 74/467 |
| 2009/0165587 | A1 * | 7/2009 | Ariga | F16H 57/0423 74/467 |
| 2010/0050800 | A1 * | 3/2010 | Michishita | B60K 6/36 74/421 A |
| 2010/0180721 | A1 * | 7/2010 | Quehenberger | F16H 57/0419 74/606 R |
| 2011/0041649 | A1 * | 2/2011 | Iwata | F16H 57/0447 74/606 R |
| 2011/0192245 | A1 * | 8/2011 | Shioiri | F16H 57/0423 74/467 |
| 2011/0245010 | A1 * | 10/2011 | Nobata | F16H 57/0457 475/160 |
| 2012/0096968 | A1 * | 4/2012 | Kawamoto | F16H 57/0409 74/467 |
| 2013/0145879 | A1 * | 6/2013 | Nakamura | F16H 57/042 74/467 |
| 2015/0152954 | A1 * | 6/2015 | Kajikawa | F16H 57/045 475/150 |
| 2016/0123454 | A1 * | 5/2016 | Tahara | F16H 57/0409 74/467 |
| 2016/0123455 | A1 * | 5/2016 | Mikami | F16H 57/0424 74/467 |
| 2016/0153546 | A1 * | 6/2016 | Ogawa | F16H 57/0457 475/152 |
| 2016/0186854 | A1 * | 6/2016 | Tahara | F16H 57/0424 74/468 |
| 2016/0186855 | A1 * | 6/2016 | Tahara | F16H 57/0471 74/413 |
| 2017/0102064 | A1 * | 4/2017 | Preston | F16H 57/0457 |

FOREIGN PATENT DOCUMENTS

| | | |
|---|---|---|
| JP | 2010-223376 | 10/2010 |
| JP | 2012-189176 A | 10/2012 |
| JP | 2012189176 | * 10/2012 |

* cited by examiner

LUBRICATING STRUCTURE FOR SPEED REDUCER

INCORPORATION BY REFERENCE

The disclosure of Japanese Patent Application No. 2014-221107 filed on Oct. 30, 2014 including the specification, drawings and abstract is incorporated herein by reference in its entirety.

BACKGROUND OF THE INVENTION

1. Field of the Invention

The invention relates to a lubricating structure for a speed reducer and, more particularly, to a lubricating structure for a speed reducer, which includes, inside a case, a first reduction gear pair that rotates interlocking with an output shaft of a drive source and a second reduction gear pair that is arranged in a rotation axis direction of the first reduction gear pair with respect to the first reduction gear pair and that is lower in rotation speed than the first reduction gear pair, and which is able to reduce a stirring loss in a high speed range of the drive source by increasing lubricating oil to be stored in catch tanks as a result of providing two catch tanks such that lubricating oil that is stored at a bottom inside the case is guided to the first catch tank by scooping up the lubricating oil with the use of the first reduction gear pair and the lubricating oil is also guided to the second catch tank by scooping up the lubricating oil with the use of the second reduction gear pair.

2. Description of Related Art

There is known a structure that lubricating oil that is stored at a bottom inside a case is divided by a partition wall provided in the case and the divided parts of lubricating oil are respectively guided to a first catch tank and a second catch tank (see, for example, Japanese Patent Application Publication No. 2010-223376 (JP 2010-223376 A)).

SUMMARY OF THE INVENTION

However, because a first oil passage that guides lubricating oil to the first catch tank and a second oil passage that guides lubricating oil to the second catch tank are separated from each other by the partition wall provided in the case as described above, when any one of the first catch tank and the second catch tank becomes full of lubricating oil in capacity and has no room to contain lubricating oil, scooped-up lubricating oil flows back and returns to the bottom in the case. Thus, the efficiency of scooping up lubricating oil may decrease.

The invention provides a lubricating structure for a speed reducer, which is able to, even when any one of two catch tanks to which scooped-up lubricating oil is guided and stored becomes full of lubricating oil and has no room to contain lubricating oil, guide excess lubricating oil to the other one of the catch tanks, which still has room to store lubricating oil.

An aspect of the invention provides a lubricating structure for a speed reducer. The lubricating structure includes: a case; a first reduction gear pair provided inside the case, the first reduction gear pair being configured to rotate interlocking with an output shaft of a drive source, the first reduction gear pair including a first drive gear and a first driven gear that is in mesh with the first drive gear; a second reduction gear pair provided inside the case and arranged so as to be displaced in a rotation axis direction of the first reduction gear pair with respect to the first reduction gear pair, the second reduction gear pair including a second drive gear and a second driven gear that is in mesh with the second drive gear and that is lower in rotation speed than the first driven gear; a first catch tank arranged inside the case; a second catch tank arranged inside the case; a partition member that is a component of the case, the partition member including a partition wall that partitions an inside of the case into a first accommodation space in which the first reduction gear pair is accommodated and a second accommodation space in which the second reduction gear pair is accommodated; a first oil passage communicating with the first accommodation space, the first oil passage being configured to guide lubricating oil, stored at a bottom in the case and scooped up by the first driven gear, to the first catch tank; a second oil passage communicating with the second accommodation space, the second oil passage being configured to guide lubricating oil, stored at the bottom in the case and scooped up by the second driven gear, to the second catch tank; and a communication port provided in the partition member and communicating the first oil passage with the second oil passage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described in detail with reference to the accompanying drawings. In the following embodiment, the drawings are modified or simplified where appropriate, and the scale ratio, shape, and the like, of each portion are not always drawn accurately. Like reference numerals denote the same or corresponding members in the drawings referenced below.

Figure 1:
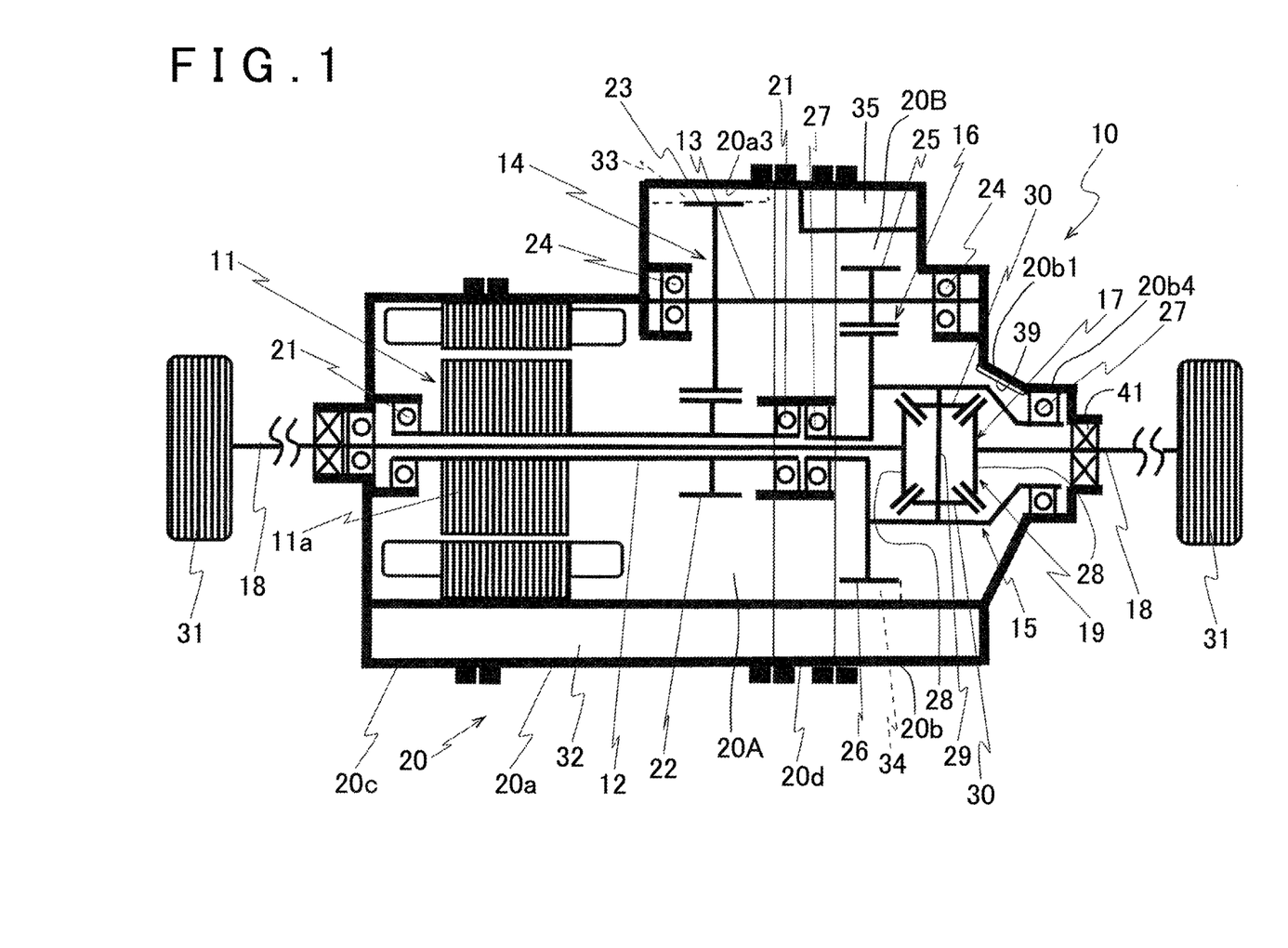
FIG. 1 is a skeletal view that illustrates the schematic configuration of a rear transaxle of a vehicle to which the invention is applied.

FIG. 1 is a skeletal view that shows the configuration of a rear transaxle 10 in an electric four-wheel-drive vehicle to which the invention is applied. The rear transaxle 10 is a dual-axis electric drive system for a vehicle. The rear transaxle 10 includes an electric motor 11 as a drive source, a first reduction gear pair 14, a second reduction gear pair 16 and a differential gear unit 19 inside a transaxle case 20 (which is an example of a case). The first reduction gear pair 14 is provided between an output shaft 12 of the electric motor 11 and a counter shaft 13 parallel to the output shaft 12. The second reduction gear pair 16 is provided between the counter shaft 13 and a differential case 15 parallel to the counter shaft 13 and concentric with the electric motor 11. The differential gear unit 19 includes the differential mechanism 17 provided inside the differential case 15. The differential gear unit 19 drives a pair of rear axles 18 to rotate by the use of torque transmitted from the electric motor 11 via the first reduction gear pair 14 and the second reduction gear pair 16.

A rotor 11a of the electric motor 11 is coupled to the center portion of the output shaft 12. A pair of bearings 21 are fitted to both ends of the output shaft 12. Thus, the output shaft 12 is rotatably supported by the transaxle case 20 via the pair of bearings 21.

The first reduction gear pair 14 consists of a small-diameter counter drive gear 22 (which is an example of a first drive gear) and a large-diameter counter driven gear 23 (which is an example of a first driven gear). The counter drive gear 22 is integrally fixed to the distal end side of one end of the output shaft 12. The counter driven gear 23 is integrally fixed to one end side of the counter shaft 13 in a state where the counter driven gear 23 is in mesh with the counter drive gear 22. The output shaft 12 and the counter shaft 13 parallel to the output shaft 12 correspond to the rotary shafts of the first reduction gear pair 14. Therefore, the rotation axis direction of the first reduction gear pair 14 means the axial direction of the output shaft 12 or counter shaft 13, and the horizontal direction in FIG. 1 corresponds to the rotation axis direction of the first reduction gear pair 14.

The counter shaft 13 is provided on the vehicle front side with respect to the concentric output shaft 12 and differential case 15 and the counter drive gear 22 and a final driven gear 26 respectively fixed to the output shaft 12 and the differential case 15. Thus, the counter driven gear 23 is arranged at the frontmost side inside the transaxle case 20. A pair of bearings 24 are respectively fitted to both ends of the counter shaft 13. The counter shaft 13 is rotatably supported by the transaxle case 20 via these pair of bearings 24.

As shown in FIG. 1, the second reduction gear pair 16 is arranged so as to be displaced in the rotation axis direction of the first reduction gear pair 14. The second reduction gear pair 16 consists of a small-diameter final drive gear 25 (which is an example of a second drive gear) and the large-diameter final driven gear 26 (which is an example of a second driven gear). The final drive gear 25 is integrally fixed to the other end of the counter shaft 13. The final driven gear 26 is arranged so as to be displaced from the counter drive gear 22 in the axial direction of the output shaft 12. The final driven gear 26 is fitted to the outer peripheral portion of the differential case 15 and integrally fixed in a state where the final driven gear 26 is in mesh with the final drive gear 25.

A pair of bearings 27 are respectively fitted to the outer peripheries of both axial ends of the differential case 15. Therefore, the final driven gear 26 integrally fixed to the differential case 15 and the differential case 15 is rotatably supported by the transaxle case 20 via these pair of bearings 27.

The differential mechanism 17 is of a generally known so-called bevel gear type. The differential mechanism 17 includes a pair of side gears 28 and a pair of pinion gears 30. The pair of side gears 28 are opposed to each other along the rotation axis inside the differential case 15. The pair of pinion gears 30 are rotatably supported by a pinion shaft 29 between these pair of side gears 28, and each are in mesh with the pair of side gears 28. The pinion shaft 29 is fixed to the differential case 15 in a state where the pinion shaft 29 is perpendicular to the rotation axis of the differential case 15.

The pair of rear axles 18 are respectively integrally coupled to the pair of side gears 28. The differential gear unit 19 that includes the differential case 15 and the differential mechanism 17 drives the pair of rear axles 18 to rotate by the use of torque transmitted from the electric motor 11 via the first reduction gear pair 14 and the second reduction gear pair 16 while allowing a rotation speed difference between the pair of rear axles 18. One of the pair of rear axles 18 is inserted through the hollow cylindrical output shaft 12 and is coupled to a vehicle left-side one of a pair of rear wheels 31.

As shown in FIG. 1, the transaxle case 20 is formed of four split portions in the axial direction of the rear axles 18. A partition member 20d that is a component of the transaxle case 20 is cylindrical in shape, and includes a partition wall 20d1 (see FIG. 4) that partitions the inside of the transaxle case 20 into a first accommodation space 20A and a second accommodation space 20B. The first reduction gear pair 14 is accommodated in the first accommodation space 20A. The second reduction gear pair 16 is accommodated in the second accommodation space 20B. The transaxle case 20 further includes a cylindrical first split case portion 20a, a lid-shaped second split case portion 20b and a lid-shaped third split case portion 20c. The first split case portion 20a is fixed to one side (left side in FIG. 1) of the partition member 20d, and includes a first side wall 20a1 (see FIG. 2) that defines the first accommodation space 20A. The second split case portion 20b is fixed to the other side (right side in FIG. 1) of the partition member 20d, and includes a second side wall 20b1 (see FIG. 1, FIG. 3 and FIG. 5) that defines the second accommodation space 20B. The third split case portion 20c mainly accommodates the electric motor 11. The first split case portion 20a, the second split case portion 20b, the third split case portion 20c and the partition member 20d, which are the components of the transaxle case 20, are fastened to one another by bolts (not shown) in an oil-tight manner as shown in FIG. 1. These split case portions 20a, 20b, 20c and partition member 20d are made of a cast light alloy, for example, by aluminum die-casting, or the like. One of the above-described pair of bearings 21 and one of the above-described pair of bearings 27 are supported by the partition member 20d.

The counter driven gear 23 and the final driven gear 26 are configured to rotate to supply lubricating oil to lubricated portions by scooping up lubricating oil stored at the bottom in the transaxle case 20. That is, scoop-up lubrication is employed in the rear transaxle 10 according to the present embodiment. The scoop-up lubrication is to supply lubricating oil to the lubricated portions by scooping up lubricating oil that is stored at the bottom inside the transaxle case 20. The lubricated portions are, for example, meshing portions of the first reduction gear pair 14 and second reduction gear pair 16, gear meshing portions and rotational sliding portions of the differential mechanism 17, the bearings 21, 24, 27, and the like.

Figure 2:
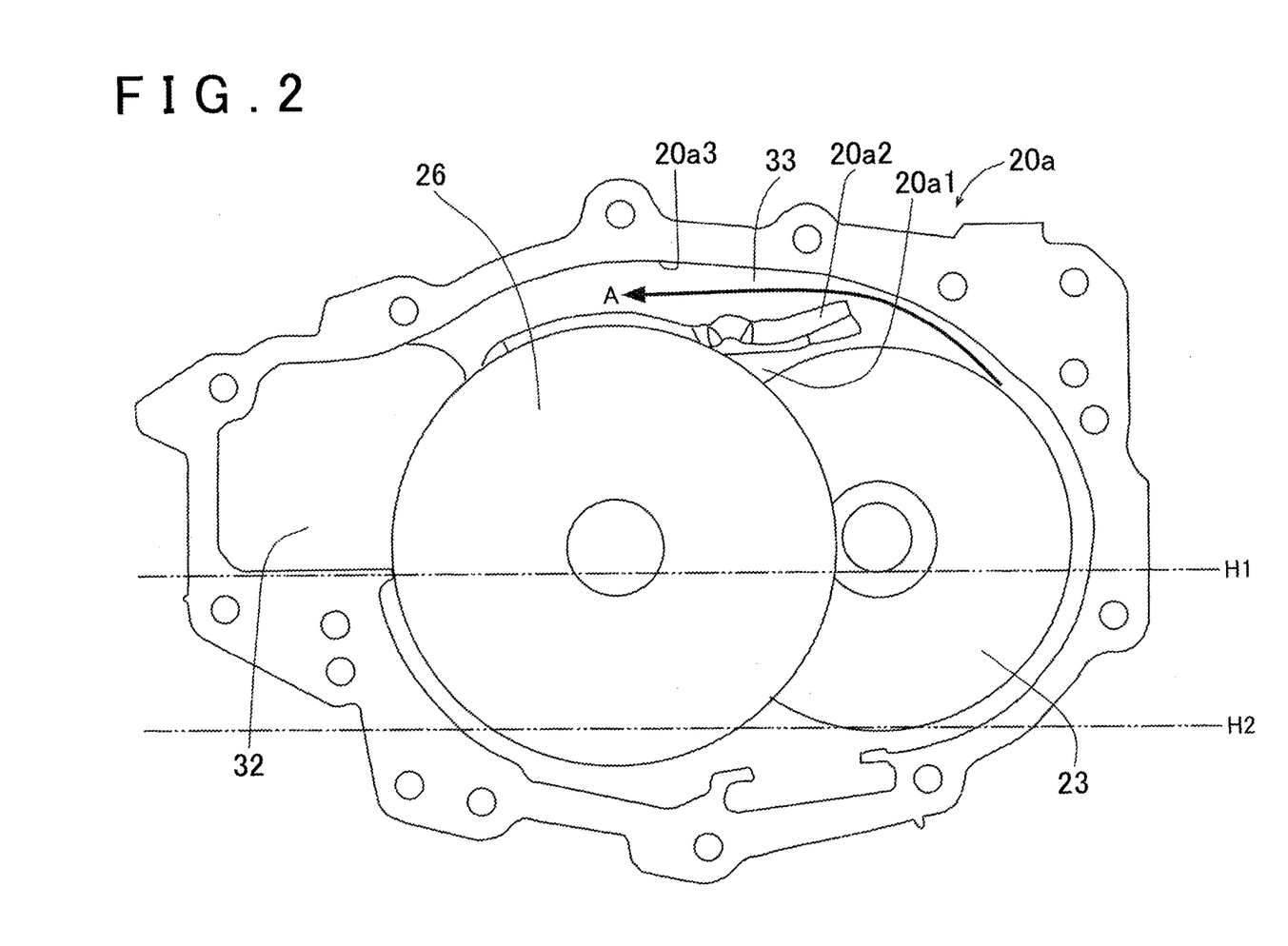
FIG. 2 is a front view that shows an opening side of a first split case portion of a transaxle case according to an embodiment of the invention.
Figure 3:
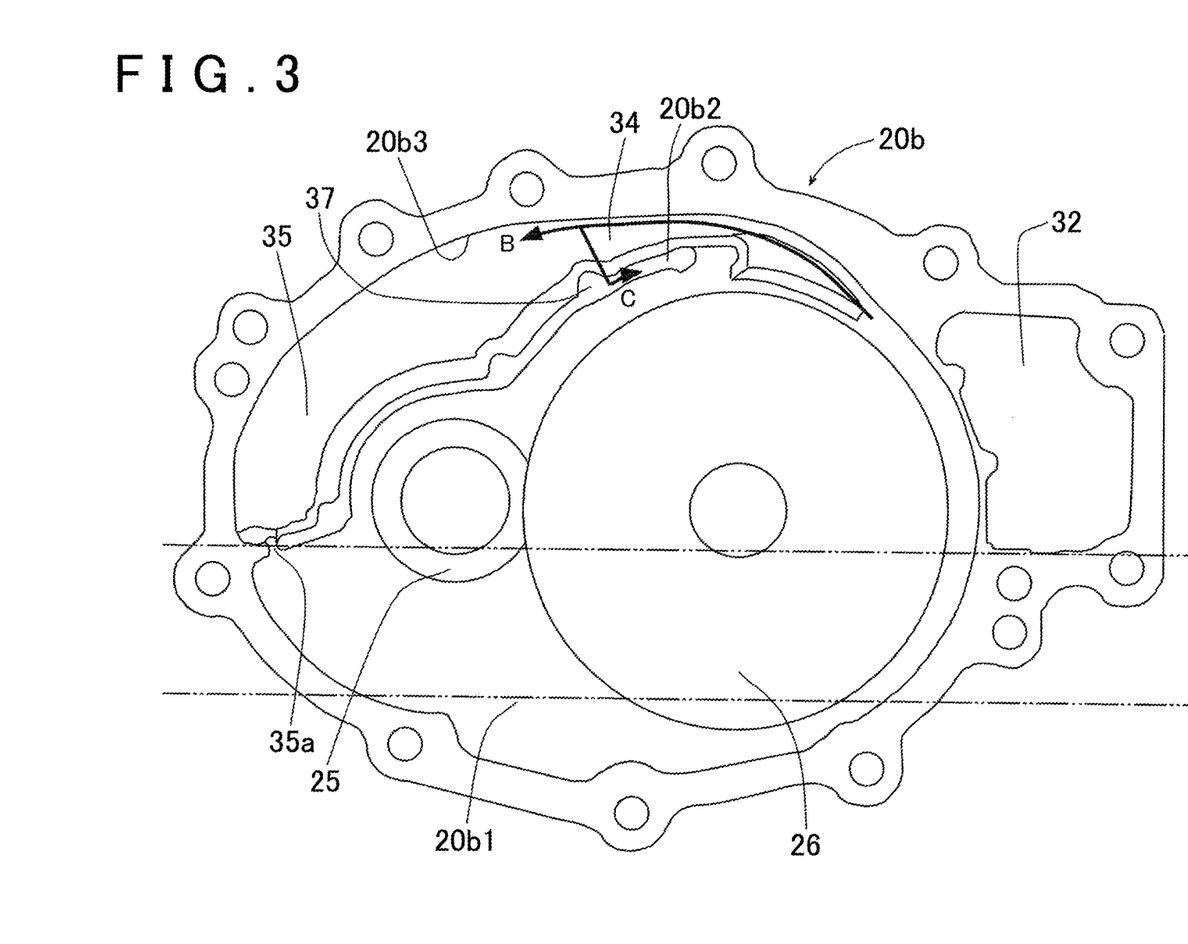
FIG. 3 is a front view that shows an opening side of a second split case portion of the transaxle case according to the embodiment of the invention.

The transaxle case 20 include a first catch tank 32 for storing part of scooped-up lubricating oil in order to lower the oil level position of lubricating oil that is stored at the bottom inside the transaxle case 20 for the purpose of reducing the stirring resistance of lubricating oil against the counter driven gear 23, which increases with an increase in vehicle speed V. As shown in FIG. 2 and FIG. 3, the first catch tank 32 is provided over the split case portions 20a, 20b, 20c and the partition member 20d such that lubricating oil is stored at a position higher than the level H1 of oil at the bottom in the transaxle case 20. The level H1 of oil is the height of lubricating oil that is stored at the bottom in the transaxle case 20 when the vehicle is stopped.

Figure 4:
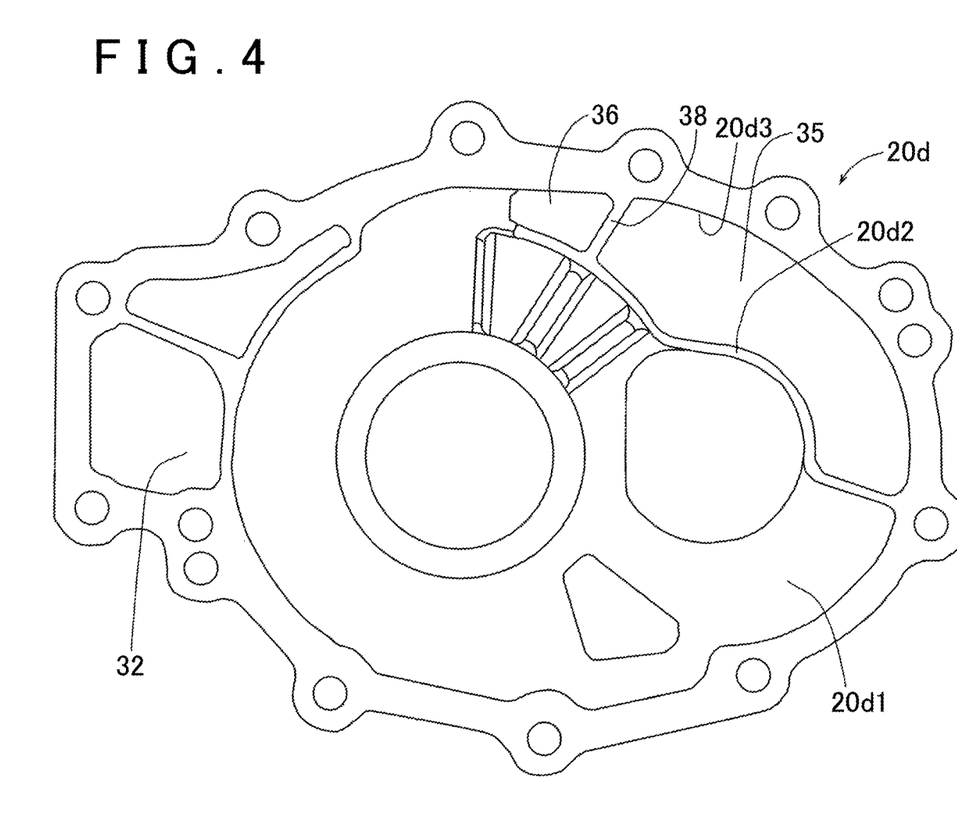
FIG. 4 is a front view that shows a side of a partition member, facing the second split case portion, in the transaxle case according to the embodiment of the invention.
Figure 5:
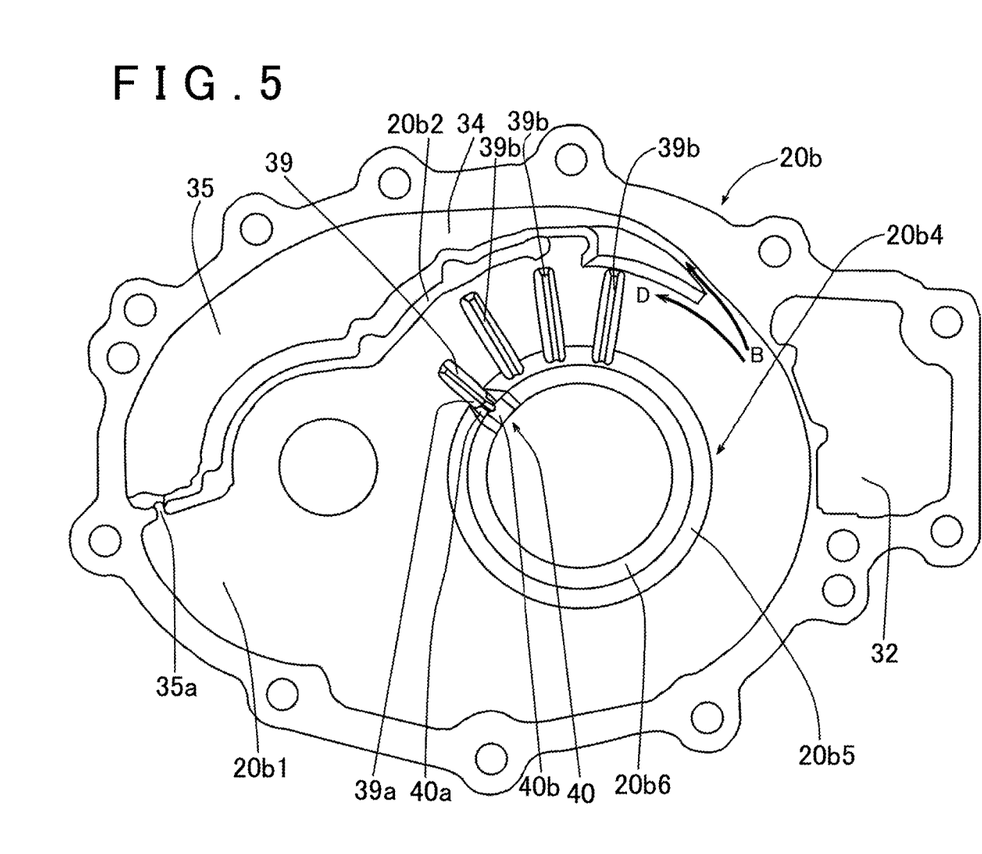
FIG. 5 is a front view that shows the opening side of the second split case portion alone according to the embodiment of the invention.

In order to reserve the upper side of the transaxle case 20 as a space for mounting a spare tire or an in-vehicle storage battery, in the present embodiment, the first catch tank 32 is arranged at the rearmost side of the transaxle case 20 (on the vehicle rear side with respect to the first reduction gear pair 14 and the second reduction gear pair 16, including the counter shaft 13, that is, the lower side in FIG. 1, the left side in FIG. 2 and FIG. 4, and the right side in FIG. 3 and FIG. 5) as an example of a position at which the first catch tank 32 avoids overlapping with both the first reduction gear pair 14 and the second reduction gear pair 16 in the vertical direction. That is, as the position at which the first catch tank 32 is arranged, the position at which the first catch tank 32 avoids overlapping with both the first reduction gear pair 14 and the second reduction gear pair 16 in the vertical direction means a zone in which the first catch tank 32 at least does not overlap with a portion over the uppermost position in both the first reduction gear pair 14 and the second reduction gear pair 16 in the height direction even when the first catch tank 32 overlaps with an area over the first reduction gear pair 14 or the second reduction gear pair 16. Because most of lubricating oil that is scooped up by the counter driven gear 23 of the first reduction gear pair 14 is splashed upward and rearward as indicated by the arrow A in FIG. 2, the first catch tank 32 is arranged at a position at which the first catch tank 32 is able to efficiently contain scooped-up lubricating oil, that is, at the rearmost side of the transaxle case 20.

Thus, the lubricating oil scoop-up operation of the counter driven gear 23 that is higher in rotation speed and higher in ability to scoop up lubricating oil (that has a larger scoop-up amount) than the final driven gear 26 of the second reduction gear pair 16 is smoothly carried out. Lubricating oil stored in the first catch tank 32 is supplied from a lubricating oil supply port (not shown) provided in the first catch tank 32 to another lubricated portion, overflows from the first catch tank 32 as a result of accumulation of lubricating oil at or above a predetermined amount or is supplied as naturally drained oil from a drain port (not shown), provided at the bottom of the first catch tank 32, to lubrication required portions, such as bearings and oil seals that are not immersed in lubricating oil as a result of a decrease in the oil level position at the bottom in the transaxle case 20. Thus, lubricating oil is returned to the bottom inside the transaxle case 20.

A first oil passage 33 is provided inside the first split case portion 20a of the transaxle case 20. The first oil passage 33 guides lubricating oil, which is scooped up by the counter driven gear 23 of the first reduction gear pair 14, to the first catch tank 32 as indicated by the arrow A in FIG. 2. On the other hand, a second oil passage 34 is provided inside the second split case portion 20b of the transaxle case 20. The second oil passage 34 guides lubricating oil, which is scooped up by the final driven gear 26 of the second reduction gear pair 16, to a second catch tank 35 as indicated by the arrow B in FIG. 3. As shown in FIG. 1, the second oil passage 34 is arranged so as to be displaced with respect to the first oil passage 33 in the axial direction of the counter shaft 13 (that is, rightward in FIG. 1) that is the rotary shaft of the counter driven gear 23 of the first reduction gear pair 14. The arrangement position of the second oil passage 34 is also a position displaced with respect to the first oil passage 33 in the axial direction of the output shaft 12 (that is, rightward in FIG. 1) that is the rotary shaft of the counter drive gear 22 of the first reduction gear pair 14. That is, the second oil passage 34 is arranged so as to be displaced with respect to the first oil passage 33 in the rotation axis direction of the first reduction gear pair 14.

As shown in FIG. 2, the first oil passage 33 is formed on the outer periphery of a first oil passage wall 20a2 extending from the first side wall 20a1 of the first split case portion 20a. The first oil passage 33 is radially defined by the outer periphery of the first oil passage wall 20a2 and an outer peripheral wall 20a3 of the first split case portion 20a. The first oil passage 33 guides lubricating oil, which is scooped up by the counter driven gear 23, to the first catch tank 32.

As shown in FIG. 3, the second oil passage 34 is formed on the outer periphery of a second oil passage wall 20b2 extending from the second side wall 20b1 of the second split case portion 20b. The second oil passage 34 is radially defined by the outer periphery of the second oil passage wall 20b2 and an outer peripheral wall 20b3 of the second split case portion 20b. The second oil passage 34 guides lubricating oil, which is scooped up by the final driven gear 26, to the second catch tank 35. As shown in FIG. 3 to FIG. 5, the second catch tank 35 is provided at a position higher than the level H1 of oil at the bottom in the transaxle case 20 as in the case of the first catch tank 32 in order to store scooped-up lubricating oil and lower the oil level position of lubricating oil that is stored at the bottom inside the transaxle case 20.

The second catch tank 35 is radially defined by the outer periphery of the second oil passage wall 20b2, a tank wall 20d2 (see FIG. 4) extending from the partition wall 20d1 of the partition member 20d, the outer peripheral wall 20b3 of the second split case portion 20b and an outer peripheral wall 20d3 (see FIG. 4) of the partition member 20d. The second catch tank 35 is defined in the axial direction by the second side wall 20b1 of the second split case portion 20b and the partition wall 20d1 of the partition member 20d. The second catch tank 35 has a drain hole 35a at its bottom. The drain hole 35a drains lubricating oil. Lubricating oil guided to the second catch tank 35 naturally drains from the drain hole 35a, and is returned to the bottom inside the transaxle case 20.

As shown in FIG. 1, the second catch tank 35 is provided at a position within the projected area of the accommodation space of the counter driven gear 23 in the rotation axis direction of the counter driven gear 23 on the outer peripheral side of the final drive gear 25. In this way, the second catch tank 35 is allowed to be provided in the dead space of the unit of the speed reducer including the first reduction gear pair 14 and the second reduction gear pair 16, so it is possible to increase the total capacity of the catch tank including the first catch tank 32 without increasing the size of the unit of the speed reducer.

As shown in FIG. 4, the partition wall 20d1 of the partition member 20d has a window 36 as a communication port that communicates the first oil passage 33 with the second oil passage 34. As shown in FIG. 3, the second split case portion 20b has a weir 37 on the outer periphery of the second oil passage wall 20b2. The weir 37 is able to guide lubricating oil, scooped up to the second oil passage 34, to the window 36. The weir 37 is provided by utilizing an ejector pin seat that is generally provided in order to easily remove the second split case portion 20b from a die at the time of casting the second split case portion 20b. The weir 37 is provided at a downstream side near a position corresponding to the window 36 to the second oil passage 34. As shown in FIG. 3, the weir 37 works to guide part of flow (indicated by the arrow B) of lubricating oil scooped up to the second oil passage 34 such that the part of flow of the scooped-up lubricating oil changes its direction toward the window 36 and merges into the first oil passage 33 as indicated by the arrow C. As shown in FIG. 4, a guide wall 38 extending from the partition wall 20*d*1 of the partition member 20*d* connects the tank wall 20*d*2 with the outer peripheral wall 20*d*3, and guides lubricating oil, guided as indicated by the arrow C, to the window 36.

Via the window 36 provided in the partition member 20*d*, the second oil passage 34 that guides scooped-up lubricating oil to the second catch tank 35 communicates with the first oil passage 33 that guides scooped-up lubricating oil to the first catch tank 32. Thus, of the two catch tanks 32, 35, that is, the first catch tank 32 and the second catch tank 35 to each of which scooped-up lubricating oil is guided and stored, even when the second catch tank 35 becomes full of lubricating oil first and has no room to contain lubricating oil, excess lubricating oil is guided as indicated by the arrow C in FIG. 3 via the window 36 to the first catch tank 32 that still has room to store lubricating oil, so it is possible to improve the efficiency of scooping up lubricating oil. Even when the first catch tank 32 becomes full of lubricating oil first and has no room to contain lubricating oil, excess lubricating oil merges from the first oil passage 33 via the window 36 into the second oil passage 34, and is guided to the second catch tank 35 that still has room to store lubricating oil, so it is possible to improve the efficiency of scooping up lubricating oil.

As shown in FIG. 5, a rib 39 is provided. The rib 39 extends from a position near the back face side of the second oil passage 34 on the inner face side of the second side wall 20*b*1 of the second split case portion 20*b*, that is, the lower side of the second oil passage wall 20*b*2, toward an inner peripheral portion 20*b*4 that is a rotation axis side of the final driven gear 26, that is, a rotation axis side of the differential case 15, in the second side wall 20*b*1. A groove 40 is provided in the second side wall 20*b*1. The groove 40 is provided so as to face an end edge 39*a* of the rib 39. Lubricating oil trapped by the rib 39 is introduced into the groove 40. The groove 40 communicates with lubricating oil supply objects. The lubricating oil supply objects are the bearing 27 that supports the final driven gear 26 on the second split case portion 20*b* and an oil seal 41 that shuts off the inside of the second split case portion 20*b* from the outside. The lubricating oil supply objects are provided on the second side wall 20*b*1 near the rotation axis of the final driven gear 26.

Figure 6:
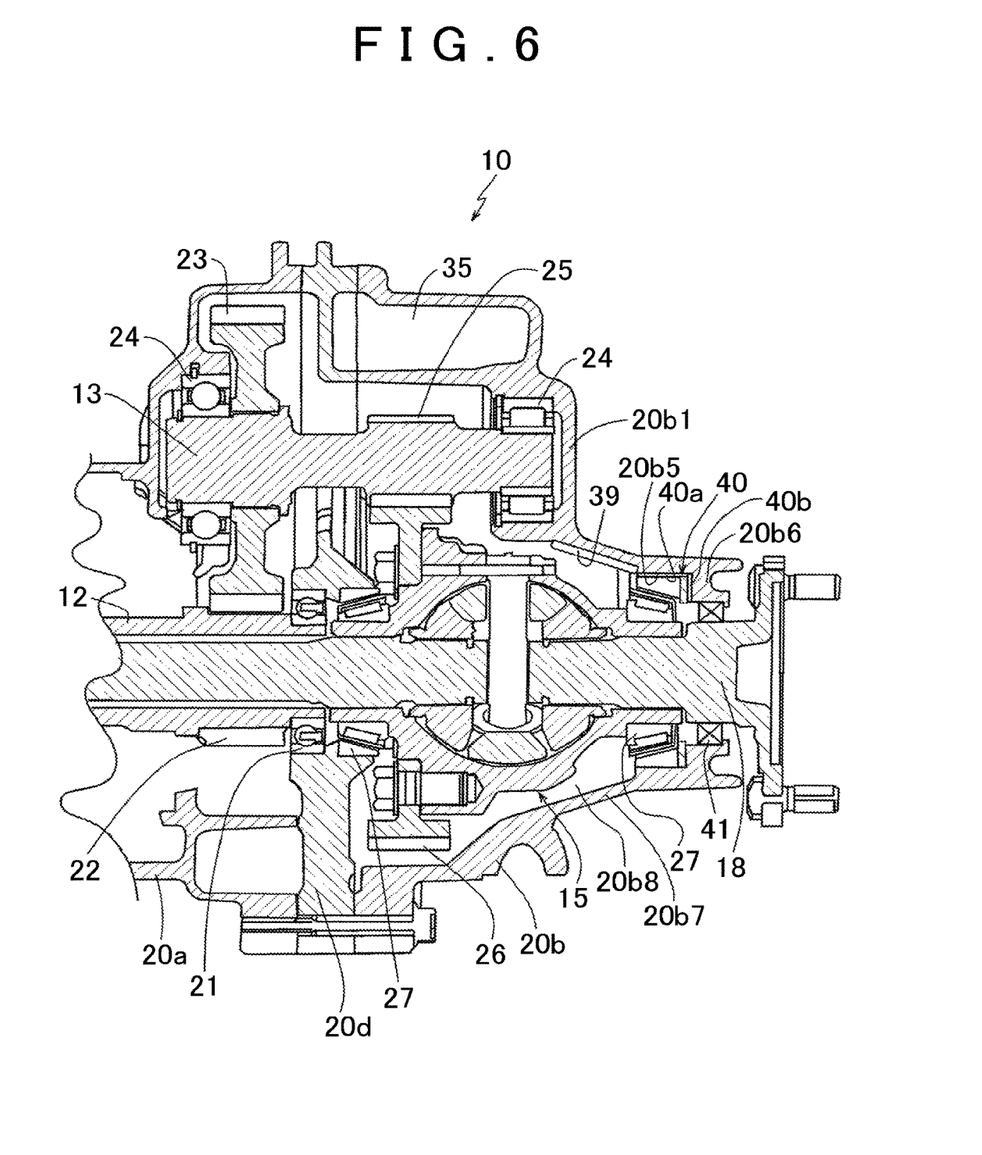
FIG. 6 is a longitudinal sectional view of the rear transaxle of the vehicle to which the invention is applied with part cut away.

At least one auxiliary rib 39*b*, three auxiliary ribs 39*b* in the example shown in FIG. 5, are provided side by side with the rib 39 on the preceding side with respect to the rib 39 in the rotation direction of the final driven gear 26. As shown in FIG. 6, the second side wall 20*b*1 is formed in a tapered shape so as to have a taper portion 20*b*7 that approaches the rotation axis of the final driven gear 26 as the taper portion 20*b*7 distances from the final driven gear 26. Part of the differential case 15 is provided so as to face the taper portion 20*b*7 of the second side wall 20*b*1, and a tapered clearance 20*b*8 (see FIG. 6) is formed between the part of the differential case 15 and the taper portion 20*b*7.

As shown in FIG. 5 and FIG. 6, the groove 40 includes a groove 40*a* and a groove 40*b*. The groove 40*a* is recessed in the inner periphery of a bearing hole 20*b*5 for the bearing 27 provided on the second split case portion 20*b*. The groove 40*b* is recessed in a step wall 20*b*6 formed between the bearing 27 and the oil seal 41. The groove 40*a* recessed in the inner periphery of the bearing hole 20*b*5 for the bearing 27 is wider in width than the rib 39. The groove 40 is provided at substantially the center in the width direction of the rib 39. The groove 40 guides lubricating oil to the bearing 27 and the oil seal 41 that are the lubricating oil supply objects. After the lubricating oil lubricates the bearing 27 and the oil seal 41, the lubricating oil is returned to the bottom inside the transaxle case 20. Because the groove 40 is provided at substantially the center in the width direction of the rib 39, when the final driven gear 26 rotates in the reverse direction, for example, when the vehicle moves backward, as well as when the vehicle moves forward, it is possible to introduce lubricating oil from the rib 39 to the groove 40.

Because the rib 39 is provided in the second split case portion 20*b*, lubricating oil that has a low scoop-up height and that has not reached the second oil passage 34 within lubricating oil scooped up by the final driven gear 26 passes near the back face side of the second oil passage 34, that is, the lower side of the second oil passage wall 20*b*2, as indicated by the arrow D in FIG. 5. This flow of lubricating oil, indicated by the arrow D, is restricted from revolving by the rib 39, lubricating oil flows along the rib 39 toward the axis, and is supplied from the outer peripheral side to the bearing 27 for lubrication, and also flows into the groove 40*a* formed in the inner peripheral portion of the bearing hole 20*b*5. Lubricating oil that has flowed into the groove 40*a* passes through the groove 40*b* formed in the step wall 20*b*6, and is supplied to the bearing 27 from the back side (right side in FIG. 6) of the bearing 27 that is the lubricating oil supply object for lubrication, and is also supplied to the oil seal 41 that is the lubricating oil supply object for lubrication.

By providing the auxiliary ribs 39*b* on the preceding side with respect to the rib 39 in the rotation direction of the final driven gear 26, it is also possible to trap lubricating oil that has a low scoop-up height and that has not reached the second oil passage 34 within lubricating oil scooped up by the final driven gear 26 with the use of the auxiliary ribs 39*b*. Lubricating oil scooped up by the final driven gear 26 and caused to fly off along the axis toward the taper portion 20*b*7 of the second side wall 20*b*1 flows into the tapered clearance 20*b*8 formed between the taper portion 20*b*7 and the outer periphery of the differential case 15. Part of lubricating oil restricted from revolving by the auxiliary ribs 39*b* flows toward the axis along the auxiliary ribs 39*b* and the wall face of the taper portion 20*b*7 and is supplied to the bearing 27 from the outer peripheral side for lubrication. Lubricating oil that has reached the rib 39 over the auxiliary ribs 39*b* and lubricating oil that has flowed into between the last auxiliary rib 39*b* and the rib 39 are restricted from revolving by the rib 39, flow toward the axis along the rib 39, and are supplied to the bearing 27, and also flow into the groove 40*a* formed in the inner peripheral portion of the bearing hole 20*b*5. Lubricating oil that has flowed into the groove 40*a* passes through the groove 40*b* formed in the step wall 20*b*6 and is supplied to the bearing 27 from the back side (right side in FIG. 6) of the bearing 27 that is the lubricating oil supply object for lubrication, and is also supplied to the oil seal 41 that is the lubricating oil supply object for lubrication. In this way, part of lubricating oil scooped up by the final driven gear 26 is directly supplied to the bearing 27 or the oil seal 41, which is the lubricating oil supply object, without passing through the second catch tank 35 or the first catch tank 32, so it is possible to carry out quick lubrication. Because lubricating oil scooped up by the final driven gear 26 is supplied to the bearing 27 or the oil seal 41, which is the lubricating oil supply target, by the use of the rib 39 and the groove 40, it is not necessary to form a special oil passage.

As shown in FIG. 2 and FIG. 3, in a state where the vehicle is stopped, the counter driven gear 23 of the first reduction gear pair 14 and the final driven gear 26 of the second reduction gear pair 16 are arranged at the level at which at least substantially the lower half of the counter driven gear 23 of the first reduction gear pair 14 and the lower half of the final driven gear 26 of the second reduction gear pair 16 are immersed in lubricating oil that is stored at the bottom in the transaxle case 20. The level H1 indicated by the alternate long and two-short dashes line in FIG. 2 and FIG. 3 indicates the height of lubricating oil that is stored at the bottom in the transaxle case 20 during a stop of the vehicle. The rotor 11a of the electric motor 11 is also arranged at the level at which at least substantially the lower half of the rotor 11a of the electric motor 11 is immersed in lubricating oil that is stored at the bottom in the transaxle case 20 during a stop of the vehicle.

The vehicle starts traveling, the scoop-up amount of lubricating oil that is stored at the bottom in the transaxle case 20 increases with an increase in vehicle speed, and the height of the lubricating oil gradually begins to decrease from the level H1. In a state where the vehicle speed is substantially 50 kilometers per hour, the height of lubricating oil that is stored at the bottom in the transaxle case 20 is the level H2 indicated by the alternate long and two-short dashes line in FIG. 2 and FIG. 3, and even the lowermost portion of the counter driven gear 23 of the first reduction gear pair 14 is almost not immersed in lubricating oil. On the other hand, the lower end of the final driven gear 26 of the second reduction gear pair 16 is kept immersed in lubricating oil.

Therefore, even when the vehicle speed reaches substantially 50 kilometers per hour and it becomes difficult for the counter driven gear 23, which is higher in ability to scoop up lubricating oil than the final driven gear 26, to scoop up lubricating oil from the bottom in the transaxle case 20, the state where lubricating oil is allowed to be scooped up by the final driven gear 26 is maintained. Structurally, rotation of the final driven gear 26 is slower than that of the counter driven gear 23; however, when the vehicle speed is substantially 50 kilometers per hour, rotation of the final driven gear 26 is also increased, so it is possible to scoop up lubricating oil from the bottom in the transaxle case 20 with the use of only the final driven gear 26.

As described above, the rear transaxle 10 (which is an example of a lubricating structure for a speed reducer) according to the present embodiment includes, inside the transaxle case 20 (which is an example of a case), the first reduction gear pair 14 that rotates interlocking with the output shaft 12 of the electric motor 11 (which is an example of a drive source) and the second reduction gear pair 16 arranged so as to be displaced in the rotation axis direction of the first reduction gear pair 14 with respect to the first reduction gear pair 14. The first reduction gear pair 14 includes a first drive gear and a first driven gear that is in mesh with the first drive gear. The second reduction gear pair 16 includes a second drive gear and a second driven gear that is in mesh with the second drive gear and that is lower in rotation speed than the first driven gear. The rear transaxle 10 further includes the first catch tank 32 arranged inside the transaxle case 20, the second catch tank 35 arranged inside the transaxle case 20, the partition member 20d that is a component of the transaxle case 20 and that includes the partition wall 20d1 that partitions the inside of the transaxle case 20 into the first accommodation space 20A in which the first reduction gear pair 14 is accommodated and the second accommodation space 20B in which the second reduction gear pair 16 is accommodated, the first oil passage 33 that communicates with the first accommodation space 20A and that guides lubricating oil, stored at the bottom in the transaxle case 20 and scooped up by the first driven gear, to the first catch tank 32, the second oil passage 34 that communicates with the second accommodation space 20B and that guides lubricating oil, stored at the bottom in the transaxle case 20 and scooped up by the second driven gear, to the second catch tank 35, and the window 36 (which is an example of a communication port) that is provided in the partition member 20d and that communicates the first oil passage 33 with the second oil passage 34. Thus, the first oil passage 33 that guides scooped-up lubricating oil to the first catch tank 32 and the second oil passage 34 that guides scooped-up lubricating oil to the second catch tank 35 communicate with each other via the window 36 provided in the partition member 20d1. With this configuration, of the two catch tanks 32, 35, that is, the first catch tank 32 and the second catch tank 35 to each of which scooped-up lubricating oil is guided and stored, even when any one of the catch tanks becomes full of lubricating oil and has no room to contain lubricating oil, excess lubricating oil is guided to the other one of the catch tanks, which still has room to store lubricating oil, so it is possible to improve the efficiency of scooping up lubricating oil.

As described above, with the rear transaxle 10 (which is an example of a lubricating structure for a speed reducer) according to the present embodiment, the transaxle case 20 includes the partition member 20d, the first split case portion 20a that is fixed to one side of the partition member 20d and that has the first side wall 20a1 that defines the first accommodation space 20A, and the second split case portion 20b that is fixed to the other side of the partition member 20d and that has the second side wall 20b1 that defines the second accommodation space 20B, the first oil passage 33 is radially defined by the outer periphery of the first oil passage wall 20a2 extending from the first side wall 20a1 and the outer peripheral wall 20a3 of the first split case portion 20a, and the second oil passage 34 is radially defined by the outer periphery of the second oil passage wall 20b2 extending from the second side wall 20b1 and the outer peripheral wall 20b3 of the second split case portion 20b. Thus, it is possible to define the first oil passage 33 and the second oil passage 34 just by mating and fixing the first split case portion 20a and the second split case portion 20b to the partition member 20d.

As described above, with the rear transaxle 10 (which is an example of a lubricating structure for a speed reducer) according to the present embodiment, the second split case portion 20b includes the weir 37 on the outer periphery of the second oil passage wall 20b2, and the weir 37 is able to guide lubricating oil, scooped up to the second oil passage 34, to the window 36. Thus, it is possible to guide scooped-up lubricating oil from the second oil passage 34 to the first oil passage 33.

As described above, with the rear transaxle 10 (which is an example of a lubricating structure for a speed reducer) according to the present embodiment, the weir 37 is the ejector pin seat of the second split case portion 20b. Thus, the ejector pin seat required at the time of casting the second split case portion 20b is also used as the weir 37, so it is not necessary to form the weir 37 exclusively.

As described above, with the rear transaxle 10 (which is an example of a lubricating structure for a speed reducer)

according to the present embodiment, the second catch tank 35 is radially defined by the outer periphery of the second oil passage wall 20b2, the outer periphery of the tank wall 20d1 extending from the partition wall 20d1, the outer peripheral wall 20b3 of the second split case portion 20b and the outer peripheral wall 20d3 of the partition member 20d. Thus, it is possible to define the second catch tank 35 just by mating and fixing the second split case portion 20b to the partition member 20d.

As described above, with the rear transaxle 10 (which is an example of a lubricating structure for a speed reducer) according to the present embodiment, the second catch tank 35 has the drain hole 35a at its bottom, and the drain hole 35a drains lubricating oil. Thus, it is possible to return lubricating oil, stored in the second catch tank 35, to the bottom in the transaxle case 20.

As described above, with the rear transaxle 10 (which is an example of a lubricating structure for a speed reducer) according to the present embodiment, the drive source is the electric motor 11, the first reduction gear pair 14 is provided between the output shaft 12 and the counter shaft 13 parallel to the output shaft 12, the second reduction gear pair 16 is provided between the counter shaft 13 and the differential case 15 parallel to the counter shaft 13 and accommodating the differential mechanism 17 that drives the pair of axles 18 to rotate, the first driven gear is the counter driven gear 23 that is a larger diameter one of the first reduction gear pair 14 and that is fixed to the counter shaft 13, the second driven gear is the final driven gear 26 fixed to the differential case 15, and the second catch tank 35 is provided at a position within the projected area of the accommodation space of the counter driven gear 23 in the rotation axis direction of the counter driven gear 23 on the outer peripheral side of the second drive gear. Thus, the invention is applicable to a vehicle including at least the pair of electrically driven axles 18. In this way, the second catch tank 35 is allowed to be provided in the dead space of the unit of the speed reducer including the first reduction gear pair 14 and the second reduction gear pair 16, so it is possible to increase the total capacity of the catch tank including the first catch tank 32 without increasing the size of the unit of the speed reducer.

When there are a plurality of embodiments, unless otherwise specified, it is clear that characterized portions of the respective embodiments are allowed to be combined with each other as needed.

What is claimed is:

1. A lubricating structure for a speed reducer, the lubricating structure comprising:
   a case;
   a first reduction gear pair provided inside the case, the first reduction gear pair being configured to rotate interlocking with an output shaft of a drive source, the first reduction gear pair including a first drive gear and a first driven gear that is in mesh with the first drive gear;
   a second reduction gear pair provided inside the case and arranged so as to be displaced in a rotation axis direction of the first reduction gear pair with respect to the first reduction gear pair, the second reduction gear pair including a second drive gear and a second driven gear that is in mesh with the second drive gear and that is lower in rotation speed than the first driven gear;
   a first catch tank arranged inside the case;
   a second catch tank arranged inside the case;
   a partition member that is a component of the case, the partition member including a partition wall that partitions an inside of the case into a first accommodation space in which the first reduction gear pair is accommodated and a second accommodation space in which the second reduction gear pair is accommodated;
   a first oil passage communicating with the first accommodation space, the first oil passage being configured to guide lubricating oil, stored at a bottom in the case and scooped up by the first driven gear, to the first catch tank;
   a second oil passage communicating with the second accommodation space, the second oil passage being configured to guide lubricating oil, stored at the bottom in the case and scooped up by the second driven gear, to the second catch tank; and
   a communication port provided in the partition member and communicating the first oil passage with the second oil passage, wherein
   the case includes the partition member, a first split case portion fixed to one side of the partition member and including a first side wall that defines the first accommodation space, and a second split case portion fixed to the other side of the partition member and including a second side wall that defines the second accommodation space,
   the first oil passage is radially defined by an outer periphery of a first oil passage wall extending from the first side wall and an outer peripheral wall of the first split case portion, and
   the second oil passage is radially defined by an outer periphery of a second oil passage wall extending from the second side wall and an outer peripheral wall of the second split case portion.

2. The lubricating structure according to claim 1, wherein the second split case portion includes a weir on the outer periphery of the second oil passage wall, and the weir is able to guide the lubricating oil, scooped up to the second oil passage, to the communication port.

3. The lubricating structure according to claim 2, wherein the weir is an ejector pin seat of the second split case portion.

4. The lubricating structure according to claim 1, wherein the second catch tank is radially defined by the outer periphery of the second oil passage wall, an outer periphery of a tank wall extending from the partition wall, the outer peripheral wall of the second split case portion and an outer peripheral wall of the partition member.

5. The lubricating structure according to claim 1, wherein the second catch tank has a drain hole at its bottom, and the drain hole is configured to drain lubricating oil.

6. The lubricating structure according to claim 1, wherein the drive source is an electric motor,
   the first reduction gear pair is provided between the output shaft and a counter shaft parallel to the output shaft,
   the second reduction gear pair is provided between the counter shaft and a differential case parallel to the counter shaft and accommodating a differential mechanism configured to drive a pair of axles to rotate,
   the first driven gear is a counter driven gear that is a larger diameter one of the first reduction gear pair and that is fixed to the counter shaft,
   the second driven gear is a final driven gear fixed to the differential case, and
   the second catch tank is provided at a position within a projected area of an accommodation space of the counter driven gear in a rotation axis direction of the counter driven gear on an outer peripheral side of the second drive gear.

7. The lubricating structure according to claim 1, wherein the first oil passage and the second oil passage are provided at positions that overlap with each other when viewed in the rotation axis direction of the first reduction gear pair.

8. A lubricating structure for a speed reducer, the lubricating structure comprising:
   a case;
   a first reduction gear pair provided inside the case, the first reduction gear pair being configured to rotate interlocking with an output shaft of a drive source, the first reduction gear pair including a first drive gear and a first driven gear that is in mesh With the first drive gear;
   a second reduction gear pair provided inside the case and arranged so as to be displaced in a rotation axis direction of the first reduction gear pair with respect to the first reduction gear pair, the second reduction gear pair including a second drive gear and a second driven gear that is in mesh with the second drive gear and that is lower in rotation speed than the first driven gear;
   a first catch tank arranged inside the case;
   a second catch tank arranged inside the case;
   a partition member that is a component of the case, the partition member including a partition wall that partitions an inside of the case into a first accommodation space in which the first reduction gear pair is accommodated and a second accommodation space in which the second reduction gear pair is accommodated;
   a first oil passage communicating with the first accommodation space, the first oil passage being configured to guide lubricating oil, stored at a bottom in the case and scooped up by the first driven gear, to the first catch tank;
   a second oil passage communicating with the second accommodation space, the second oil passage being configured to guide lubricating oil, stored at the bottom in the case and scooped up by the second driven gear, to the second catch tank; and
   a communication port provided in the partition member and communicating the first oil passage with the second oil passage,
   wherein the second oil passage is radially defined by an outer peripheral wall of the second accommodation space and an outer periphery of an oil passage wall, and
   wherein the second oil passage includes a weir on the outer periphery of the oil passage wall that changes a direction of a portion of the lubricating oil, scooped up to the second oil passage, toward the communication port.

9. The lubricating structure according to claim 8, wherein the portion of the lubricating oil, scooped up to the second oil passage, is merged into the first oil passage via the communication port.

* * * * *